(12) United States Patent
Huang et al.

(10) Patent No.: US 12,465,775 B2
(45) Date of Patent: Nov. 11, 2025

(54) APPARATUSES AND METHODS FOR LIMITING LOAD CURRENT IN NANOSECOND PULSED POWER SOURCES

(71) Applicant: PULSE BIOSCIENCES, INC., Hayward, CA (US)

(72) Inventors: Chaofeng Huang, San Jose, CA (US); Gregory P. Schaadt, Santa Clara, CA (US); Kenneth R. Krieg, Fremont, CA (US)

(73) Assignee: Pulse Biosciences, Inc., Hayward, CA (US)

( * ) Notice: Subject to any disclaimer, the term of this patent is extended or adjusted under 35 U.S.C. 154(b) by 773 days.

(21) Appl. No.: 17/633,676

(22) PCT Filed: Sep. 29, 2020

(86) PCT No.: PCT/US2020/053248
§ 371 (c)(1),
(2) Date: Feb. 8, 2022

(87) PCT Pub. No.: WO2021/067255
PCT Pub. Date: Apr. 8, 2021

(65) Prior Publication Data
US 2022/0313990 A1    Oct. 6, 2022

Related U.S. Application Data

(60) Provisional application No. 62/909,187, filed on Oct. 1, 2019.

(51) Int. Cl.
*A61N 1/378* (2006.01)
*H01B 11/18* (2006.01)

(52) U.S. Cl.
CPC ............. *A61N 1/378* (2013.01); *H01B 11/18* (2013.01)

(58) Field of Classification Search
CPC .............................. A61N 1/327; A61N 1/378
See application file for complete search history.

(56) References Cited

U.S. PATENT DOCUMENTS 2,631,232 A    3/1953   Baracket
2,923,898 A    2/1960   Goad
(Continued)

FOREIGN PATENT DOCUMENTS

GB              896759 A    5/1962
WO       WO03/047684 A2    6/2003
(Continued)

OTHER PUBLICATIONS

Extended European Search Report mailed Oct. 7, 2022 for European Application 20871379.2; 7 pages.
(Continued)

*Primary Examiner* — William J Levicky
(74) *Attorney, Agent, or Firm* — Shay Glenn LLP (57) ABSTRACT

Described herein are apparatuses and methods for applying high voltage, high current, sub-microsecond (e.g., nanosecond range) pulsed output to a biological material, e.g., tissues, cells, etc., while preventing damage from load arcing. Some of the apparatuses and methods described herein may limit the load and pulsed power source current in case of load arcing significantly by using a transmission line (e.g., coaxial cable, twisted pair or parallel pair cables) between the pulsed power source and the load having a length configured to achieve this goal.

25 Claims, 8 Drawing Sheets

(56) References Cited

U.S. PATENT DOCUMENTS

| | | | |
|---|---|---|---|
| 3,098,976 | A | 7/1963 | Leakey |
| 4,155,017 | A | 5/1979 | Gaule et al. |
| 5,469,174 | A | 11/1995 | McCorkle |
| 6,326,177 | B1 | 12/2001 | Schoenbach et al. |
| 6,429,674 | B1 | 8/2002 | Barth et al. |
| 7,893,696 | B2 | 2/2011 | Stockinger |
| 8,000,813 | B2 | 8/2011 | Schoenbach et al. |
| 8,512,334 | B2 | 8/2013 | Nuccitelli et al. |
| 8,675,378 | B2 | 3/2014 | Beland |
| 8,822,222 | B2 | 9/2014 | Beebe et al. |
| 9,070,537 | B2 | 6/2015 | Yuzunhara et al. |
| 9,101,764 | B2 | 8/2015 | Nuccitelli et al. |
| 9,724,155 | B2 | 8/2017 | Nuccitelli et al. |
| 10,763,565 | B1 | 9/2020 | Green |
| 10,850,095 | B2 | 12/2020 | Ebbers et al. |
| 11,167,125 | B2 | 11/2021 | Moss et al. |
| 2008/0231337 | A1* | 9/2008 | Krishnaswamy ...... H03K 3/537 327/291 |
| 2009/0219071 | A1 | 9/2009 | Tao et al. |
| 2010/0038971 | A1 | 2/2010 | Sanders et al. |
| 2011/0092973 | A1 | 4/2011 | Nuccitelli et al. |
| 2013/0092846 | A1* | 4/2013 | Henning ............ G01N 21/6408 250/564 |
| 2014/0364797 | A1 | 12/2014 | Schoenbach et al. |
| 2015/0201991 | A1 | 7/2015 | Zemlin |
| 2017/0245928 | A1 | 8/2017 | Xiao et al. |
| 2018/0078755 | A1* | 3/2018 | Kreis ................. A61N 1/36017 |
| 2018/0102769 | A1* | 4/2018 | Prager ................... H03H 11/02 |

FOREIGN PATENT DOCUMENTS

| | | |
|---|---|---|
| WO | WO2016/019004 A1 | 2/2016 |
| WO | WO2021/067255 A1 | 4/2021 |

OTHER PUBLICATIONS

Kohler et al.; Simultaneous high intensity ultrashort pulsed electric field and temperature measurements using a unique electro-optic probe; IEEE Microwave and Wireless Components Letters; 22(3); pp. 153-155; Feb. 24, 2012.

International Search Report and Written Opinion mailed Dec. 31, 2020 for PCT/US2020/053248; 9 pages.

Koperda et al.; Position determination using pulse delays; IBM Technical Disclosure Bulletin; 27(48); Sep. 1984; 4 pages retrieved from the internet ( https://www.nextgendo.com/ftp/Position_Determination_Using_Pulse_Delays_IBM_1984.pdf) on Nov. 2, 2020.

* cited by examiner

APPARATUSES AND METHODS FOR LIMITING LOAD CURRENT IN NANOSECOND PULSED POWER SOURCES

CROSS REFERENCE TO RELATED APPLICATIONS

This patent application is a U.S. national phase application under 35 U.S.C. 371 of International Patent Application No. PCT/US2020/053248, titled "APPARATUSES AND METHODS FOR LIMITING LOAD CURRENT IN NANOSECOND PULSED POWER SOURCES," filed on Sep. 29, 2020, now International Patent Publication No. WO2021/067255, which claims priority to U.S. provisional patent application No. 62/909,187, titled "APPARATUSES AND METHODS FOR LIMITING LOAD CURRENT IN NANOSECOND PULSED POWER SOURCES," filed on Oct. 1, 2019, each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are pulsed power sources that limit load current using long transmission lines (e.g., coaxial cable, twisted pair or parallel pair transmission lines) to introduce distributed inductance and transmission line delay to prevent damage to the pulsed power source. These apparatuses (systems and devices) generally relate to high-voltage, rapid (e.g., nanosecond, picosecond, etc.) pulsing. In particular, described herein are nanosecond pulsing systems and apparatuses capable of delivering a high-voltage, nanosecond pulsed electrical fields (nsPEF) for electrotherapy.

BACKGROUND

A "nanosecond pulsed electric field" (nsPEF) may be applied for medical and/or therapeutic purposes, including in particular for the treatment of biological materials (e.g., cells and tissues). nsPEF may include an electrical field with a pulse duration that may be less than about 1000 nanosecond (ns), such as between about 0.1 ns and 1000 ns, and may have peak voltages that are high voltage, in some variations as high as about 5 kV/cm, about 10 kV/cm, about 20 kV/cm, about 50 kV/cm, about 100 kV/cm, about 250 kV/cm, or about 500 kV/cm. Such high voltage, very brief pulses present unique problems for therapeutic medical devices. In particular, the delivery of rapidly changing (e.g., nanosecond or faster pulses) at high voltage may result in load arcing. Load arcing may occur when pulse power is delivered to a tissue (load), and may result in damage to the high-voltage pulse generator, as current (e.g., currents greater than 1 kA) may be transmitted from the load back to the pulse generator. Since an arc at the load is effectively a sudden, unexpected, short-circuit at the load, this high short-circuit current (more than 1 kA) will be reflected back from the arc to the pulse generator and the relatively high applied voltages and currents may result in a large return current that may damage the circuitry of the pulse generator.

Therefore, it is desirable to provide devices and apparatuses, including systems for nanosecond pulsed electrical field generation and delivery, that are configured to allow the generation and delivery of variable-duration, nanosecond pulsed electrical fields for electrotherapy that solve the existing problems, including those caused by arcing. It is further desirable to provide apparatuses, and method of using them that may prevent damage to the apparatus from load arcing, without substantially impacting system performance. Such apparatuses and methods will be particularly useful in the growing field of therapeutic nsPEF, including for the treatment of cancer/tumors, skin disorders, and other applications.

SUMMARY OF THE DISCLOSURE

Described herein are apparatuses (systems, devices, etc.), and methods for applying high voltage (in some variations, high current), sub-microsecond (e.g., nanosecond range) pulsed output to a biological material, e.g., tissues, cells, etc., while preventing damage to the apparatus from load arcing. Some of the apparatuses and methods described herein may limit the load and pulsed power source current in case of load arcing significantly by using transmission lines (e.g., coaxial cable, twisted pair or parallel pair cables) between the pulsed power source and the load having a length that is relatively long, and in particular, greater than half of the maximum pulse duration divided by the characteristic pulse speed on the cable. By selecting the length of the transmission line as described herein, the reliability of the pulsed power supply (e.g., the nanosecond pulse generator) may be improved. As used herein, in reference to applied energy, such as electromagnetic field energy, the term "pulse width" may be interchangeably with "pulse duration."

For example, described herein are apparatuses for delivering nanosecond pulsed electrical energy that include a transmission cable configured to limit or prevent load arcing current from reaching the pulse generator. Any of these apparatuses may include: a nanosecond pulse generator configured to provide at least a high voltage, high current pulsed output having a maximum pulse duration of up to 1000 ns; a transmission cable coupled to the nanosecond pulse generator at a first end, the transmission cable having a characteristic impedance ($Z_0$) and a characteristic pulse speed on the cable (v), wherein the transmission cable may have a length between the first end and a second end that is greater than half of the maximum pulse duration divided by the characteristic pulse speed on the cable; and a pulse delivery output, wherein the pulse delivery output couples to the second end of the transmission cable.

The nanosecond pulse generator may be, for example, a tunable, high-voltage, nanosecond pulse generator based on a Marx Generator stack hybrid circuit, having a plurality of different stages that each include, at each stage, a stack of power MOSFETs that allow relatively high charging voltages at each stage, permitting an overall output voltage with a single trigger. For example, see U.S. application Ser. No. 15/148,334 (publication no. US20170245928A1, titled "High-voltage analog circuit pulser with feedback control"), herein incorporated by reference in its entirety.

For example, the nanosecond pulse generator may be configured to provide at least a 200 kV/µs high voltage, high-current pulsed output. The high voltage (in some variations, high current) pulsed output generated by the nanosecond pulse generator may be, for example, configured to have a voltage of greater than 15 kV and an output current of greater than 300 A.

Any of these apparatuses may be configured so that the transmission cable, which is typically quite long (e.g., between 20 feet and 420 feet long), is secured to prevent it from interfering with the rest of the apparatus. For example, the transmission cable may be wound within and/or around the pulse generator. In some variations the transmission cable may be enclosed within a housing, so that only a small portion of it (e.g., between 1-7 feet of the second end of the transmission cable, connecting to the pulse delivery output) is exposed. The same housing may enclose all or some of the nanosecond pulse generator, or a different housing may enclose the cable and the pulse generator. In some variations, the apparatus includes a housing enclosing at least a portion of the nanosecond pulse generator, further wherein at least a majority (e.g., all except the last 1-10 feet) of the transmission cable is stored within the housing.

The transmission cable may be configured to transmission of the high-current, high-voltage, nanosecond pulses. For example, the cable may be a high-voltage coaxial cable such as a Teledyne Reynolds 167-2669 or 178-8793 cable, having a 31 ohm characteristic impedance (rated to 20 kV). The transmission cable may be coaxial cable, twisted pair or parallel pair transmission cable types. The transmission cable may have a characteristic impedance between, e.g., about 30 ohms and 175 ohms. The transmission cable may have a characteristic pulse speed on the cable that is between about 1.2 ns/ft and 1.6 ns/ft.

As described above, the minimum length of the transmission cable connecting the pulse generator to the pulse delivery output may be greater, equal to, or greater than, one-half the maximum pulse duration time the characteristic pulse speed for the cable. This may afford the pulse generator adequate time to switch off before the reflected pulse from the load-side short circuit. The pulse duration may be, for example, between about 10 ns and about 1000 ns (e.g., between about 50 ns and about 1000 ns, between about 100 ns and 1000 ns, etc.). The apparatus (e.g., the pulse generator, and/or a controller for the pulse generator) may be configured to limit the pulse duration to less than about 1000 ns (e.g., less than about 950 ns, less than about 900 ns, less than about 850 ns, less than about 800 ns, less than about 750 ns, etc.).

In general, the apparatuses described herein may include a length of transmission cable that is greater than 25-30 feet (e.g., greater than 70 feet, greater than 75 feet, greater than 100 feet, etc.), including, for example, between about 70 and 450 feet.

Generally, shorter cable lengths are preferred for therapeutic devices. Longer cables typically result in a lower voltage/power at the output, as the resistance of the wire necessarily results in a drop in voltage/power. In addition, longer transmission lines attenuate the peak pulse voltage and may increase the pulse rise time on the load. It is surprising and counterintuitive to use a longer transmission cable as described herein to connect between a nanosecond pulse generator and a pulse delivery output. In particular, for therapeutic devices such as high-voltage, nanosecond pulsed electrical fields (nsPEF) for electrotherapy, such as those described herein, transmission cable between the nanosecond pulse generator and the pulse delivery output may be longer than the doctor's office or treatment suite. However, it was discovered that during sudden Load-end shorts or high-voltage conditions the distributed inductance of the cable, an increase in length (e.g., from 10 ft to 35 ft) can substantially decrease the extreme currents (such as those greater than 1 kA or more) that are reflected back to the pulse generator and cause damage to the switching components.

Any of the apparatuses described herein may therefore also be configured to manage the long cables described herein. For example, the majority of the cable length may be fixed (e.g., may be rigidly connected) and prevented from unwinding into a linear length, with the exception of the last x feet (e.g., the last 10 feet, the last 9 feet, the last 8 feet, the last 7 feet, the last 6 feet, the last 5 feet, the last 4 feet, the last 3 feet, the last two feet, the last one foot, etc.) on one or both ends. The fixed length of the cable may be arranged within a housing (or may form the housing) as described above. The fixed length may include additional external shielding and grounding protection.

The maximum length of the transmission cable may be limited within the range. For example, in some variations, the maximum length of the transmission cable may be less than 0.51 times the maximum pulse duration divided by the characteristic pulse speed on the cable. Thus, the transmission cable may be sufficiently long to prevent current returning to the nanosecond pulse generator from the pulse deliver output (e.g., due to arcing) from damaging the pulsed power source, as may otherwise occur if the returning current were to reach the pulse generator when the switches were closed (e.g., while applying a pulse to the first end of the transmission cable).

In any of these apparatuses, the apparatus may be configured to limit the operation of the pulse generator so that the pulsing is matched to the length of the transmission cable. For example, the apparatus may be configured so that the nanosecond pulse generator is limited to provide high voltage (in some variations, high current) pulsed output at a maximum pulse duration of 1000 ns or less.

The apparatuses described herein may be configured to operate with a pulse delivery output that is configured to deliver the high voltage, high current, nanosecond pulses to a biological tissue. For example, the pulse delivery output may comprise a handpiece configured to deliver the high voltage pulsed output. In some variations, the handpiece may include a removable tip having a plurality of tissue-penetrating electrodes. For example, any of the handpieces as described in U.S. patent application Ser. No. 16/247,469 ("TREATMENT TIP WITH PROTECTED ELECTRODES"), filed on Jan. 14, 2019, and incorporated by reference in its entirety herein, illustrate examples of handpieces having removable tips that may be used. A handpiece may be used to deliver therapeutic energy to treat a tissue (e.g., skin, tumor, etc.) in a living subject (e.g., in vivo) or in tissue removed from a subject (e.g., ex vivo).

In some variations the apparatus may include a pulse delivery output that is configured as a cuvette (e.g., a cuvette fixture) or chamber for delivering high voltage nanosecond pulses. These apparatuses may be used with isolated portions of biological material, including extracted and/or cultured cells. For example, these apparatuses and methods may be used for electroporation.

Any of the apparatuses described herein may also be configured to ensure that there is an impedance match between the load (e.g., the handpiece and/or tissue, the cuvette, etc.) and the high-voltage cable. For example, the pulse deliver output may include a matching resistor to assist in matching the resistance of the load to the characteristic resistance of the transmission cable. In some variations the pulse delivery output may include an interface feature which includes a cable impedance matching resistor. The interface feature may be integrated into the pulse delivery output or it may be separate from (and in some variations connected to) the pulse delivery output.

Any of the apparatuses described herein may include a current sensor at or near the second end of the transmission cable to provide highly accurate current sensing at the pulse delivery output. For example, the apparatus may include a current sensor that includes a pulse-rated, low-inductance resistor connected in parallel with the transmission cable and a high-bandwidth current sensor coil configured to measure current through the pulse-rated, low-inductance resistor. In some variations this current sensor may be part of the pulse delivery output and/or part of an interface feature between the transmission cable and the pulse delivery output. Alternatively or additionally, any of these apparatuses may be configured to sense voltage at the pulse delivery output using a voltage sensor.

For example, an apparatus for delivering nanosecond pulsed electrical energy may include: a nanosecond pulse generator configured to provide at least a 200 kV/µs, high voltage pulsed output having a maximum pulse duration of 1000 ns or less; a transmission cable coupled to the nanosecond pulse generator at a first end, the transmission cable having a characteristic impedance ($Z_0$) and a characteristic pulse speed on the cable (v), wherein the transmission cable has a length between the first end and a second end of between 5 and 420 feet; and a pulse delivery output, wherein the pulse delivery output couples to the second end of the transmission cable. For example, in one variation a system may include a 10 foot length of handpiece cable, with an additional 10-15 or more feet of "internal" cable (e.g., within the console), which may be sufficient to slow the rising edge of the reflected load-side short-circuit/arc and mitigate arc damage.

Also described herein are methods of using any of the apparatuses described herein to apply high voltage nanosecond pulsing from a pulse generator while preventing damage to the pulse generator. These methods may be methods for delivering the high voltage (in some cases high current) nanosecond pulses to a patient within a treatment room, in which the user (e.g., doctor, physician, surgeon, technician, nurse, etc.) is standing next to, and operating, the nanosecond pulse generator, and using a handheld pulse delivery output tool (e.g., a hand-held handpiece) to apply the nanosecond pulsed energy to the patient.

For example, a method of delivering nanosecond pulsed electrical energy to a biological material (such as a patient's tissue), may include: generating a high voltage pulsed output having a maximum pulse duration of up to 1000 ns from a nanosecond pulse generator; and transmitting the pulsed output from a first end of a transmission cable coupled to the nanosecond pulse generator to a pulse delivery output at a second end of the transmission cable at a characteristic pulse speed on the cable; wherein the transmission cable has a length between the first end and a second end that may be greater than half of the maximum pulse duration divided by the characteristic pulse speed on the cable, so that any electrical reflection from the second end of the transmission cable do not reach the nanosecond pulse generator before the nanosecond pulse generator has switched off the high voltage, high current, pulsed output. Cables lengths shorter than half the maximum pulse duration may be employed due to the dispersion of the leading edge of the reflected current and voltage pulse that will result in both a decrease in the slew-rate of the high current from the Load-side arc and may delay the peak current sufficiently to occur later than the turn-off time. At high reflected currents due to an arc, the leading edge of the reflected current or voltage can cause damage within the MOSFET due to bond-wire and packaging parasitics. The method may also include delivering the pulsed output into a tissue from a pulse delivery output coupled to the second end of the transmission cable (e.g., delivering the pulse output from a handpiece having a plurality of tissue-penetrating electrodes).

In some variations, the method may alternatively include delivering the pulse output from a pulse delivery output that includes a cuvette chamber, e.g., to electroporate isolated tissue and/or cells.

The high voltage, high current, pulsed output may have, e.g., a voltage of at least 200 kV/µs. The method may also or alternatively include limiting the high voltage, high current pulsed output of the nanosecond pulse generator to a maximum pulse duration of 1000 ns or less (e.g., less than about 950 ns, less than about 900 ns, less than about 850 ns, less than about 800 ns, less than about 750 ns, etc., between about 10 ns and 1000 ns, etc.

Transmitting the pulsed output from the first end of the transmission cable to the second end of the transmission cable may comprise transmitting the pulsed output through at least 100 feet of the length of the transmission cable (e.g., between about 35 and 420 feet of the length of the transmission cable, etc.). As described above, the length of the transmission cable may be less than 0.51 times the maximum pulse duration divided by the characteristic pulse speed on the cable. The characteristic pulse speed on the cable may be between, e.g., 1.2 ns/ft and 1.6 ns/ft.

Any of these methods may include determining a current at or near the second end of the transmission cable from a high-bandwidth current sensor coil configured to measure current through a pulse-rated, low-inductance resistor connected in parallel with the transmission cable.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

When pulsed power is delivered to a load via a cable or transmission line, if an arc or short circuit occurs at the load, the load current can rise very rapidly and will be reflected back to the pulse source. This may cause the pulsed power source to encounter a beyond-specification high current and one or more repeated load arcing events may impact the reliability of the switches inside and the whole system. This may result in damage to the apparatus, and, in particular, to the circuitry of the pulse generator.

Figure 1:
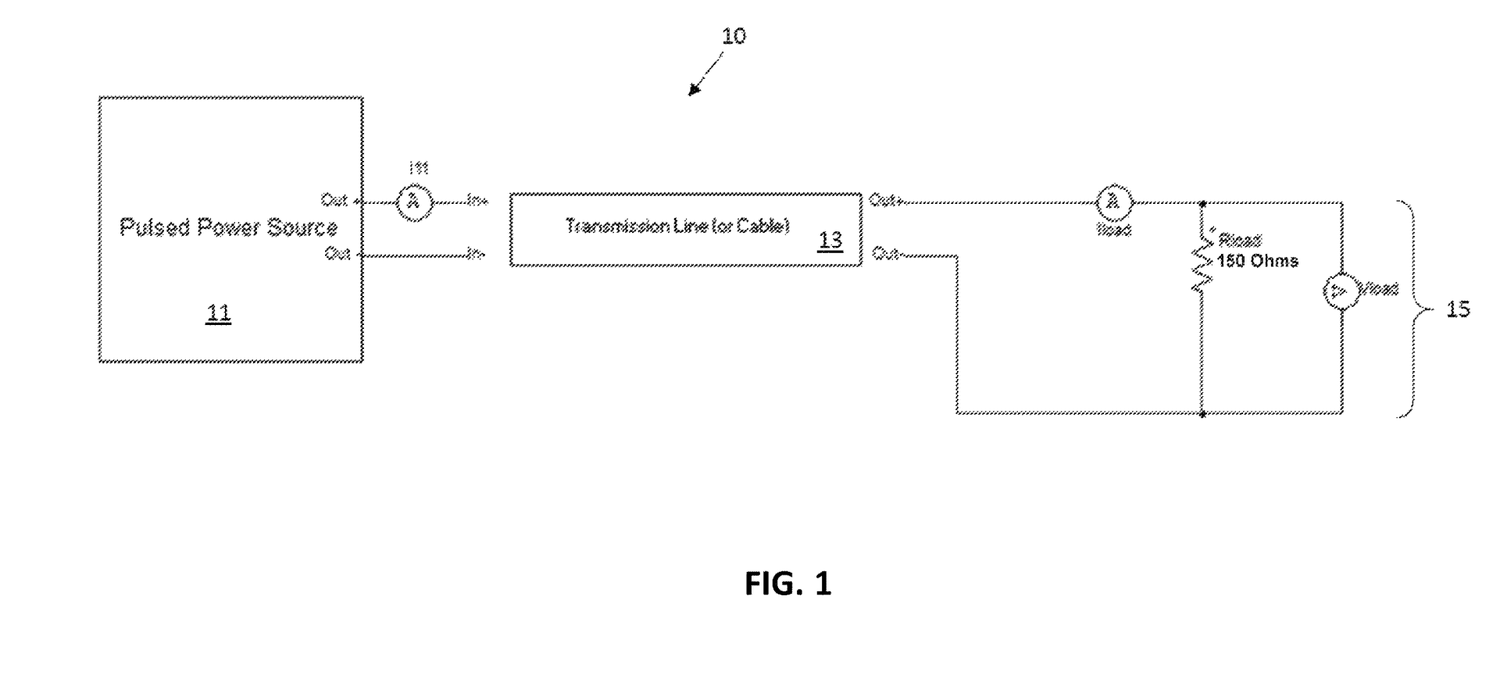
FIG. 1 is a schematic of one example of an apparatus for delivering nanosecond pulsed electrical energy including a nanosecond pulse generator (or pulsed power source) configured to provide a high voltage, high current pulsed output, a transmission line (such as transmission cable), and a pulse delivery output connected to the pulse generator through the transmission cable.

FIG. 1 schematically illustrates one example of an apparatus 10 for delivering nanosecond pulsed electrical energy that includes a nanosecond pulse generator (pulse power source) 11 configured to provide at least a high voltage, high current pulsed output in the nanosecond range (e.g., less than 1000 ns). The pulsed power source 11 is connected to a transmission line, such as cable 13 at a first end of the transmission cable. The cable may have a length, L, that is described in greater detail herein. The transmission cable has a characteristic impedance ($Z_0$) and a characteristic pulse speed on the cable (v). The characteristic pulse speed on the cable is the propagation speed of a pulse along the length of the cable and is related to the velocity factor of the cable, which in turn is related to one over the square root of the cable inductance times the cable capacitance, both being expressed per unit length. Depending on the cable properties, this may be, e.g., between 66% and 84% the speed of light, resulting in a characteristic pulse speed on the cable of between about 1.6 ns/ft and 1.2 ns/ft. The transmission cable may then connect to a load (pulse delivery output) 15. In FIG. 1, the output is shown as a generic "load".

In operation, the system may apply high voltage, high current, nanosecond-duration pulse waveforms. As will be described in greater detail below, when arcing occurs at the load 15, a high current will propagate back from the pulse delivery output or load 15 along the cable 13 to the pulsed power source, resulting in damage to the pulsed power source, particularly when the switches of the pulsed power source responsible for generating the nanosecond pulse are still closed (e.g., when delivering a pulse along the transmission line (or cable) 13). Because of the very short pulse duration, this may occur when the length of the cable is shorter than a minimum distance that may depend on the pulse duration time (e.g., pulse duration) and the characteristic pulse speed on the cable. As will be described below, it may therefore be particularly beneficial when using a high voltage, high current, nanosecond pulsed power source to use a transmission cable having a length between the first end of the transmission cable and a second end of the transmission cable that is greater than half of the maximum pulse duration divided by the characteristic pulse speed on the cable. However, in some variations it may be beneficial to have transmission cable lengths (including fixed, internal cable lengths in combination with handle cable lengths) that, while still long (e.g., 15 ft or greater, 20 ft or greater, 25 ft or greater, etc.) are less than half the maximum pulse duration divided by the characteristic pulse speed on the cable. In any of the apparatuses described herein the internal cable may be anchored within the housing of the apparatus and may be 10 feet or longer (15 feet or longer, 20 feet or longer, 25 feet or longer, etc.).

Figure 2A:
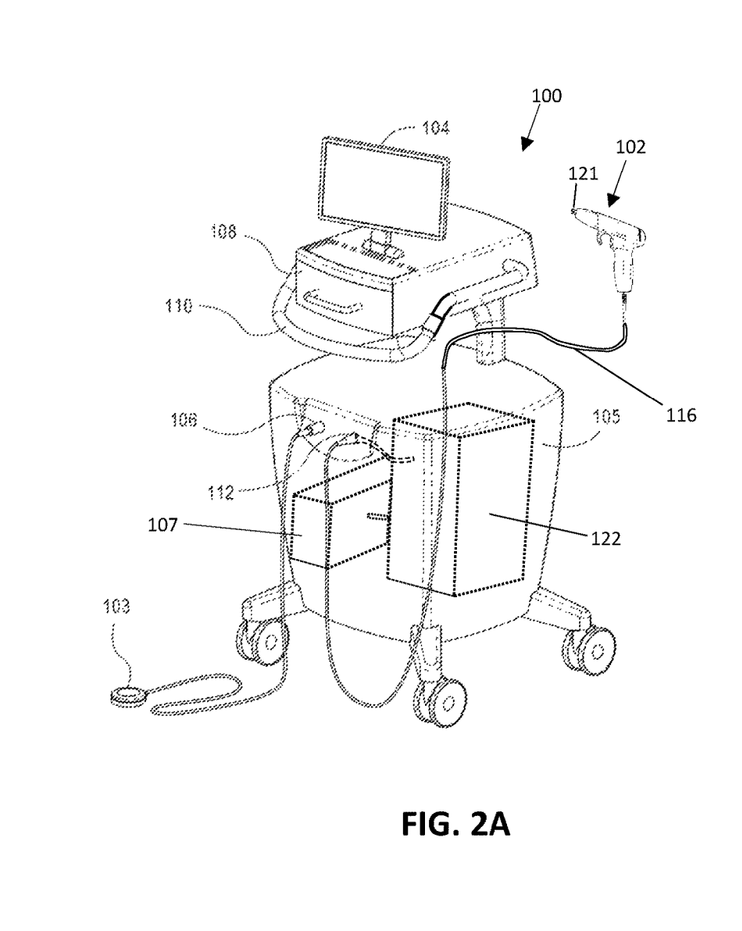
FIG. 2A is an exemplary illustration of one variation of an apparatus for delivering high-voltage, short pulses of electrical energy, such as nanosecond pulsed electrical energy as described herein.
Figure 2B:
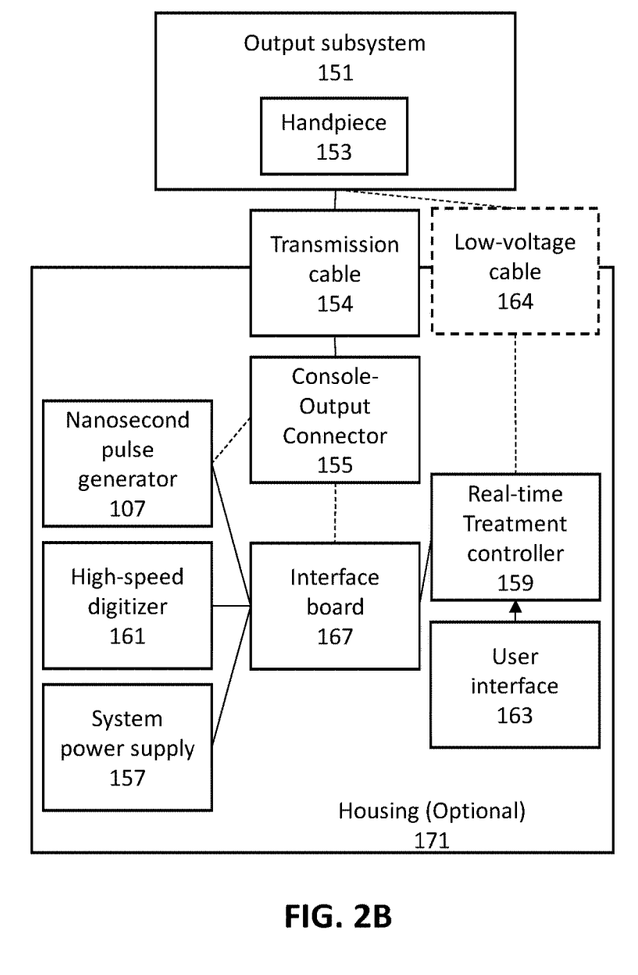
FIG. 2B is a schematic illustration of an apparatus such as the one shown in FIG. 1A.

FIGS. 2A-2B illustrate an example of a therapeutic apparatus for delivering nanosecond pulsed electrical energy.

For example, described herein are apparatuses (e.g., nanosecond pulsed electrical fields (nsPEF) apparatuses) that may provide protection of the nanosecond pulsed power source portion of the apparatus from load arcing at the pulse delivery output. These apparatuses may be configured to provide pulse durations from 50 ns to 1 µs, having rise and fall-times, for example, of about 20 ns or less, pulse voltages as high as 10-15 kV (e.g., in some variations 18 kV or more) and pulse currents of up to about 500 A (or greater).

Any of the nanosecond pulsed electrical fields (nsPEF) apparatuses described herein may include a pulse generator (nanosecond pulse generator) that is configured as a modification of a Marx high-voltage pulse generator. This circuit/system architecture may include a plurality of MOSFETs switches that may be closed to deliver the nanosecond pulses over a transmission cable. In an exemplary Marx high-voltage pulse generator the low-voltage pulse timing and triggering circuits may share common circuitry with system low voltage DC supply and system input control signals. When operating this pulse generator at high pulse voltage slew-rates, such as the 200 kV/µs, arcing at the load may result in a significant current being transmitted over the transmission cable to the pulse generator, which may interfere with pulse timing circuitry, and may destroy the electronics, such as microcontrollers or MOSFET driver ICs forming part of the pulse generator.

FIG. 2A illustrates one example of an apparatus (e.g., a system) 100 for delivering high-voltage, short pulses of electrical energy, such as nanosecond pulsed electrical energy, that includes a pulse delivery output configured as a handpiece 102 and a pulse generator 107, footswitch 103, and user interface 104. Footswitch 103 is connected to housing 105 through connector 106; the housing may enclose the electronic components, including the pulse generator and the fixed length of the transmission cable (inside box 122, having a dashed outline). The handpiece 102 may include electrodes (e.g., a removable or swappable electrode tip 121) and connects to the pulse generator 107 circuitry through the transmission cable (not shown).

The transmission cable in this example may have a very long length, e.g., between 5 and 420 feet (e.g., between 10 feet and 420 feet, between 15 feet and 240 feet, etc.). The majority of the transmission cable is within the box 122 shown by a dashed line (cable enclosure) and has a fixed predetermined length. In some variations the fixed length of cable may be positioned (e.g., wrapped) around all or a portion of the housing, including at least partially surrounding the pulse generator circuitry. In FIG. 2A, a portion 116 of the transmission cable extends outside of the housing and connects to the handpiece 102; this portion may be between 1 and 10 feet long (thus, less than 5%, less than 7%, less than 10%, less than 12%, less than 15%, etc. of the overall length of the transmission cable may extend outside of the housing and/or may be adjustable). In some variations a portion (an 'unfixed' portion) of the transmission cable may be extended or extendable outside of the housing.

The high-voltage system 100 may also include a storage drawer 108, inputs (e.g., buttons, keyboard, etc.), and a monitor (user interface) 104. Additional circuitry (e.g., control circuitry, wireless circuitry, etc.) may be included as well. The system may also include a handle 110 and a faceplate 112.

A human operator may adjust one or more of the following settings of the system: the number of pulses, current or voltage amplitude, pulse duration, and pulse frequency, for example, by entering them into a numeric keypad or a touch screen of interface 104; alternatively or additionally, the user may select from one or more predefined protocols that include predetermined parameter settings. In some embodiments, the pulse duration can be varied (e.g., within a defined range, such as between 1 ns and 1000 ns). A microcontroller (e.g., within the housing, not shown) may send signals to pulse control elements within the system 100.

In some variations, a separate low-voltage cable may be included with (e.g., wrapped with) the high-voltage transmission cable. For example, the low-voltage cable may be wrapped together with the transmission cable (or in some variations the portion of the transmission cable that extends or is extendable from the housing, e.g., the non-fixed portion of the transmission cable) to connect to the pulse delivery output (e.g., handpiece 102). The low-voltage cable may pass control signals and/or information to or from the handpiece, while the high-voltage cable transmits the high-voltage pulsed energy to the tip for delivery to the patient.

FIG. 2B is a schematic illustration of a system such as the one shown in FIG. 2A, e.g., a system 100 for delivering nanosecond pulsed electrical energy. In this example, the system includes a system power supply 157 that is configured to provide both system power and pulse generator power (these may be separately provided). The system 100 may also include a treatment controller 159 for receiving input from one or more user interfaces 163, and a high-speed digitizer 161 that may sample the system to confirm that the pulsing parameters are within the target range(s). The system may further include a nanosecond pulse generator 107 that is configured to provide at least a 200 kV/µs, high voltage (and in some cases high current) pulsed output. The nanosecond pulse generator may include a system interconnect subsystem, a low voltage pulse trigger and timing subsystem and a pulse output subsystem (not shown). The pulse generator may be a modified Marx high-voltage pulse generator.

In FIG. 2B, the system also includes an interface board 167 comprising a plurality of electromagnetic interference (EMI)-filtered, transient protected and high-voltage isolation barriers. In some variations the treatment controller, the system power supply and the nanosecond pulse generator may all connect to and/or through the interface board, as shown. In some variations all power to the pulse generator and all communications and timing signals to or from the pulse generator may be connected through the EMI-filtered, transient protected and high-voltage isolation barriers, which may be part of the interface board. Finally, the system may include a console-output connector 155 and a pulse delivery output (e.g., handpiece 153). As discussed above, the pulse delivery output may be connected to the pulse generator by the long transmission cable 154 (as shown in FIG. 2A, this may include an external portion 116 of the transmission cable and a much longer fixed internal portion (within box 122). In some variations a low-voltage cable may also be connected to the handpiece from the system controller within the housing 171; this low-voltage cable may be combined with at least the external portion of the transmission cable.

Thus, the handpiece may receive high voltage (and optionally high current) pulsed output from the pulse generator 107. The handpiece 153 may be part of the output subsystem 151, and may be configured to connect to the transmission cable, may be fixed to the transmission cable, and/or may be configured to couple with a connector connecting a length of transmission cable to the rest of the transmission cable, using an appropriate high-voltage connector.

Figure 3:
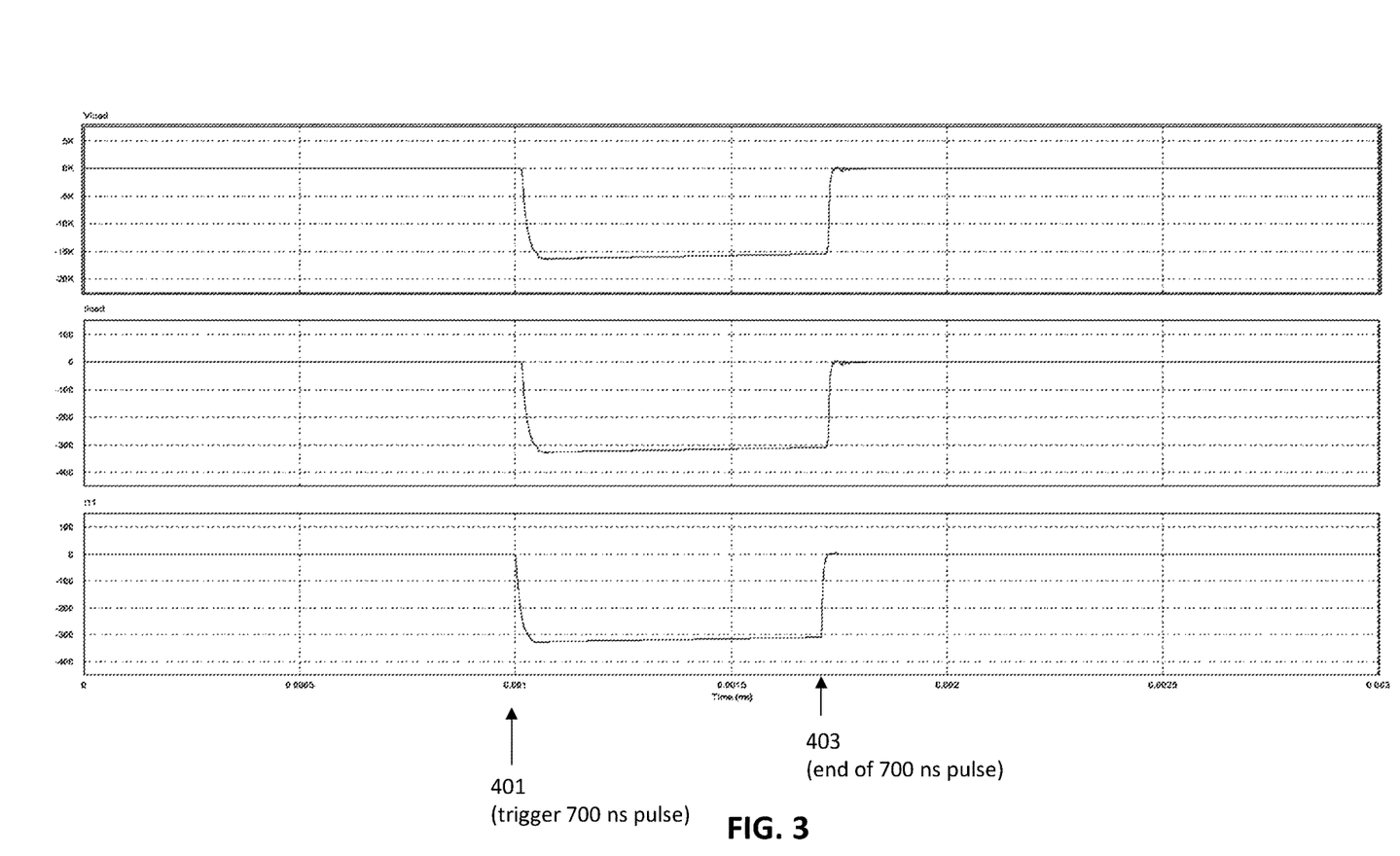
FIG. 3 shows plots of simulated load voltage (top, "$V_{load}$"), load current (middle, "$I_{load}$"), and pulse generator current (bottom, "$I_{11}$") for a 10 foot long, 50 Ohm (characteristic impedance of 50 Ohms) cable during normal operation, without any load arcing. The simulated applied pulse in this example has a pulse width (duration) of 700 ns.
Figure 4:
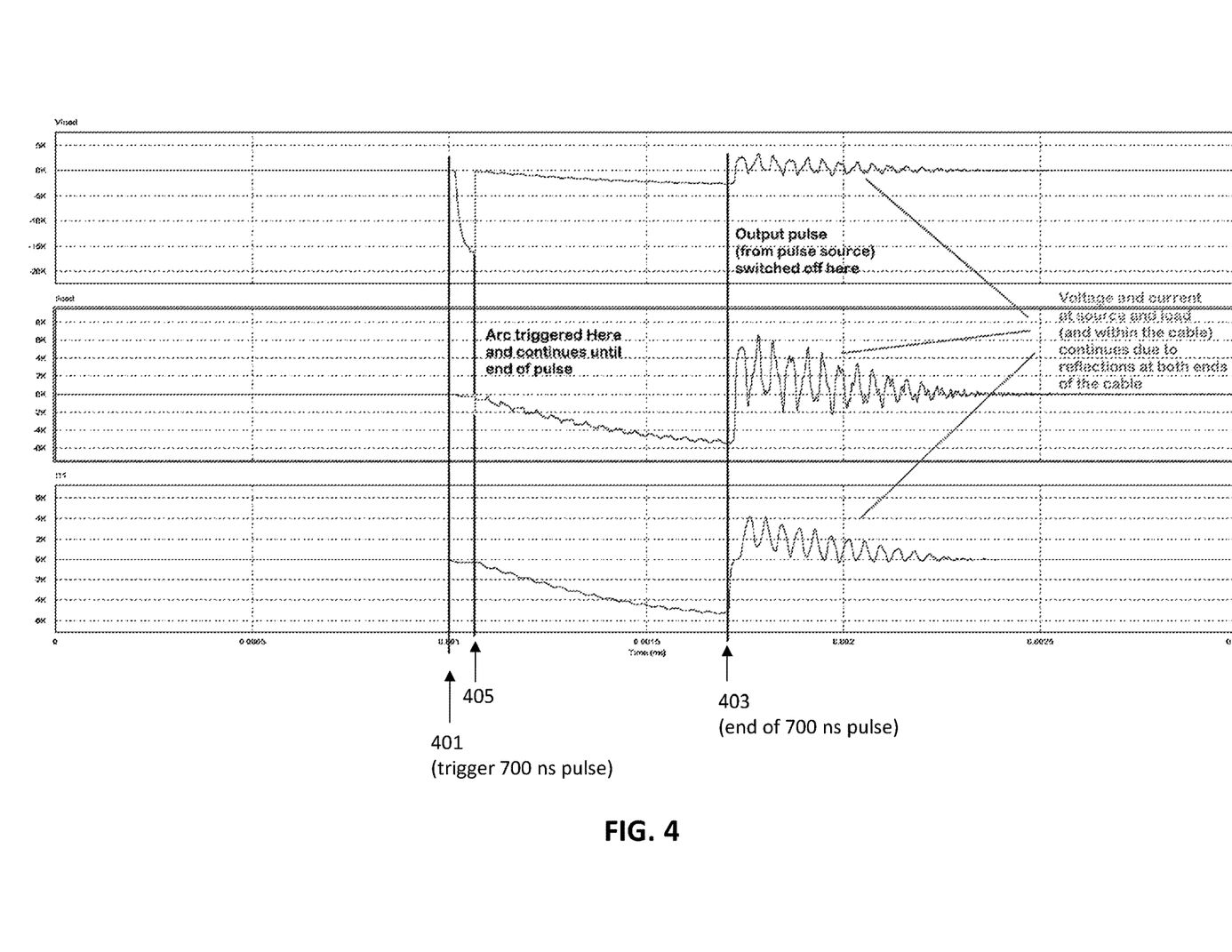
FIG. 4 shows plots of an exemplary simulation of the load voltage (top, "$V_{load}$"), load current (middle, "$I_{load}$"), and pulse generator current (bottom, "$I_{11}$") for the same 10 foot long, 50 Ohm cable of FIG. 3 in which arcing occurs shortly after the start of the pulse and continues until the end of the pulse. The simulated applied pulse has a pulse width (duration) of 700 ns.

The problem of load arcing is illustrated in FIGS. 3 and 4. FIG. 3 shows an example of a simulated set of current and voltage traces at various locations in a model system delivering high-voltage nanosecond pulsed electrical energy. For example, a system such as the one shown schematically in FIG. 1 was used to simulate a 700 nanosecond (ns) pulse delivered to a load without load arcing (FIG. 3) and with load arcing (FIG. 4). In both of these figures, the upper trace shows the voltage at the load ($V_{load}$, or load voltage), the middle trace shows the current at the load ($I_{load}$, or load current), and the bottom trace shows the current at output of the pulsed power source ($I_{11}$, or pulsed power source current). In FIG. 3, the simulated load voltage, load current and source current waveforms are shown. This simulation presumes a 10 foot long, 50-Ohm (characteristic impedance of 50 Ohms) transmission cable between the pulsed power source and the load (e.g., the pulse delivery output connected to a load) under normal working conditions, without any load arcing. The result of this simulation shows $I_{11}$ having a source peak current of about −327 A (bottom trace, showing time in ms vs. current in A), $I_{load}$ having a load peak current of about −327 A (middle trace, showing time in ms v. current in A) for the 700 ns duration pulse. The start of the pulse 401 begins at 0.001 ms and the pulse terminates 700 ns later at 403. The voltage $V_{load}$ at the load follows the applied current when there is no arcing.

In FIG. 4, traces similar to those in FIG. 3 are shown, but with load arcing triggered at 405 shortly (within 100 ns) of the start of the 700 ns pulse 401. The simulated load voltage, load current and source current waveforms for the 10-ft 50-Ohms Cable with load arcing show a source peak current of about −5.33 kA and a load peak current of about −5.46 kA. Thus, the current at the pulse generator (bottom trace) becomes very large compared to the normal (non-arcing) case, and may damage the pulse generator, particularly during the period where the pulse is being delivered and thus the switches of the pulse generator are closed, allowing current to flow back into the circuit. Note that because the pulse generator is configured for very rapid switching, it is difficult to configure the system to otherwise block or filter this reflected current. Under the conditions represented in FIG. 4, even after the pulse has ended, the voltage and current at the source and load continue to oscillate due to the continued reflectance at both ends of the transmission cable.

Figure 5:
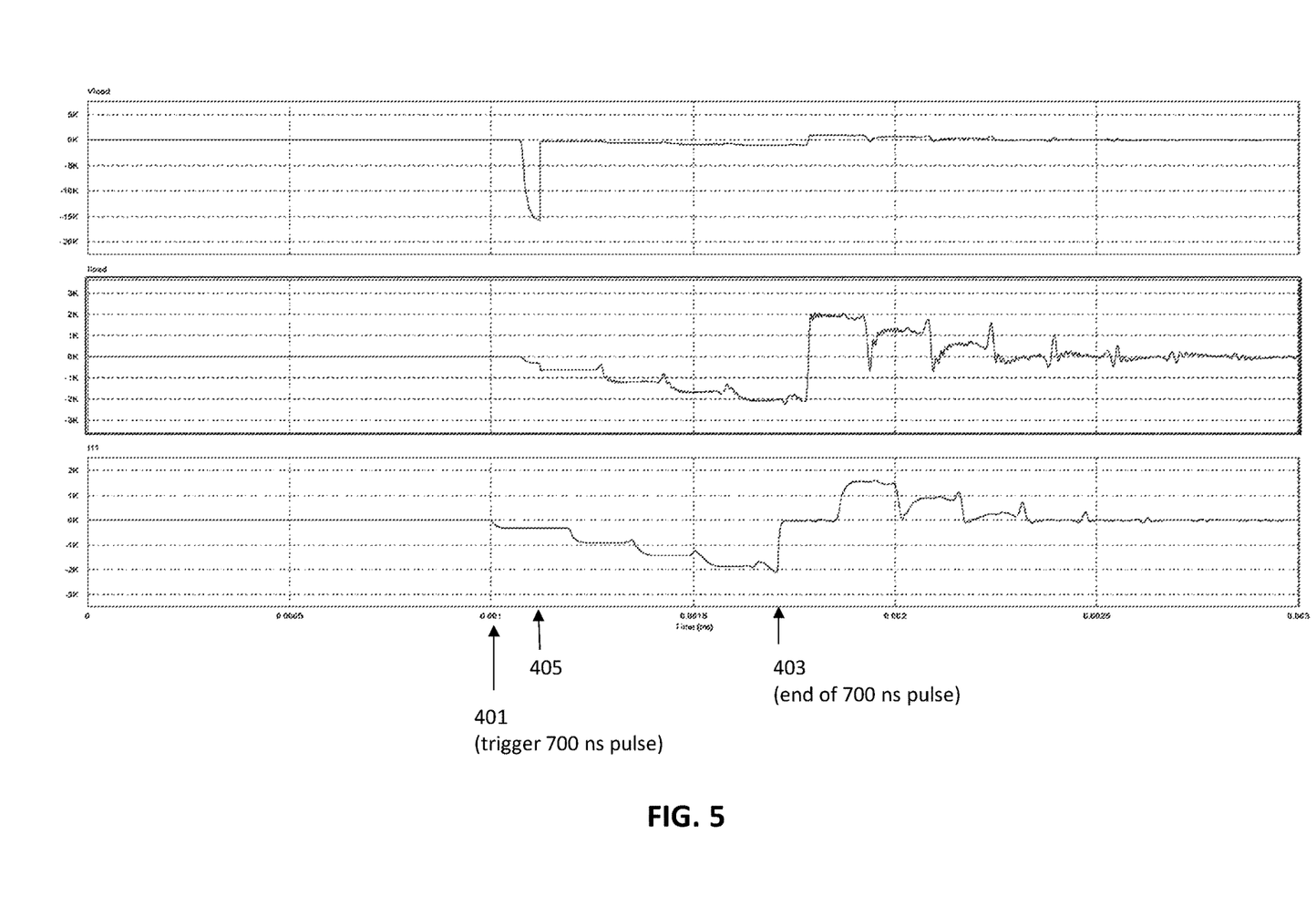
FIG. 5 shows further plots of an exemplary simulation of a load voltage (top, "$V_{load}$"), load current (middle, "$I_{load}$"), and pulse generator current (bottom, "$I_{11}$") for a 50 foot long, 50 Ohm cable, in which arcing occurs shortly after the start of the pulse and continues until the end of the pulse.
Figure 6:
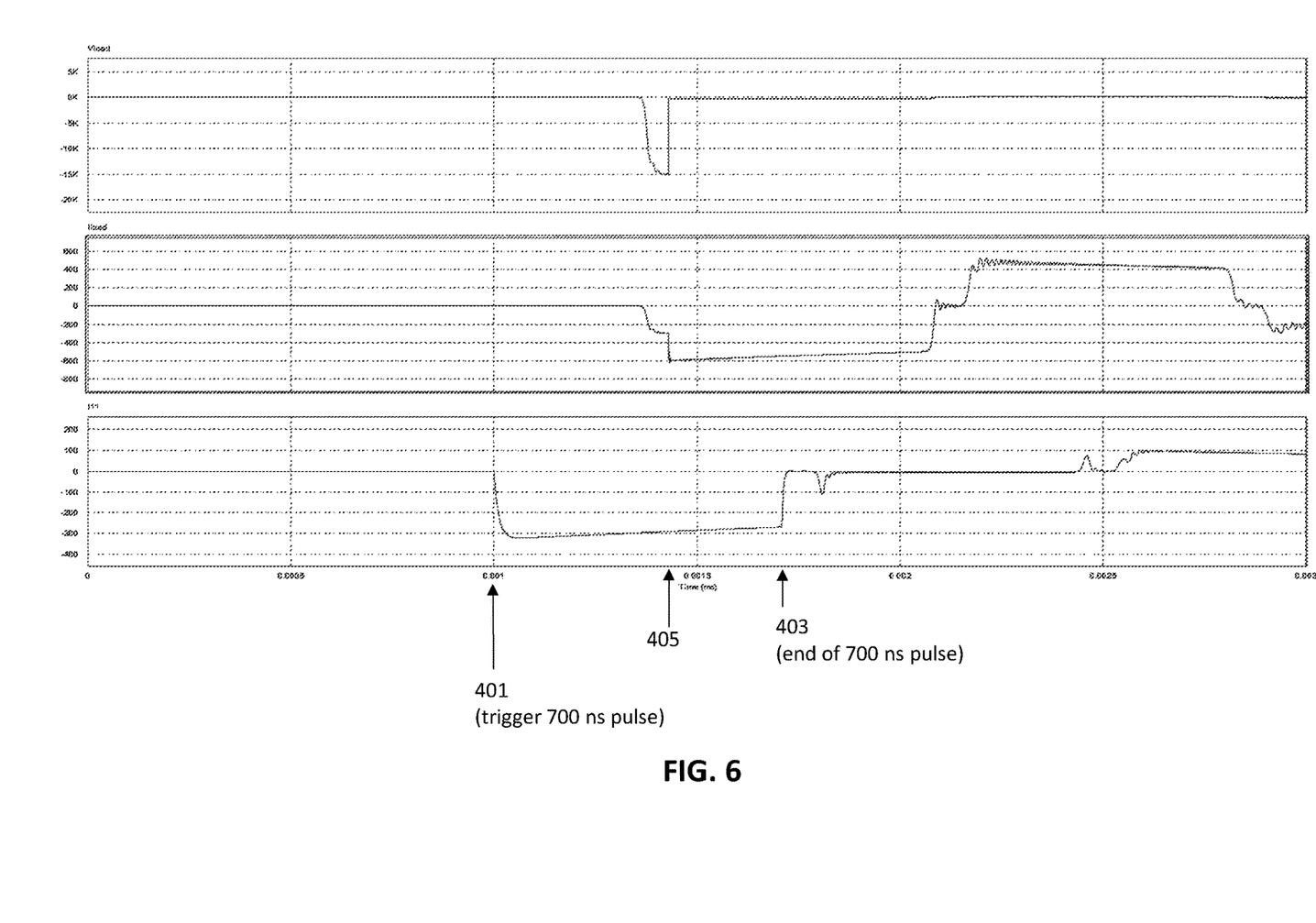
FIG. 6 shows yet another example of simulation of a load voltage (top, "$V_{load}$"), load current (middle, "$I_{load}$"), and pulse generator current (bottom, "$I_{11}$") for a 250 foot long, 50 Ohm cable, in which arcing occurs shortly after the start of the pulse and continues until the end of the pulse.

FIGS. 5 and 6 illustrate the effects of successively longer cables in the presence of load arcing. For example, FIG. 5 shows the simulated load voltage, load current and source current waveforms when the transmission cable between the pulse generator and the pulse delivery output is five times longer (e.g., is a 50 foot, 50 ohms transmission cable between the pulsed power source and the load), in the presence of the same simulated load arcing. As shown in this example, the source peak current is about −2.10 kA and the load peak current is about −2.21 kA, less than half of the peak currents for the 10 foot transmission cable simulation shown in FIG. 4. The arcing occurs at time 405 as shown on the trace, shortly after the load sees the start of the 700 ns pulse. As in FIGS. 3-4, the bottom trace shows the current $I_{11}$ applied to the transmission line by the pulse generator and the middle trace shows the current (e.g., applied to the transmission line by the pulse generator) $I_{load}$ at the load.

In the trace shown in FIG. 6 the transmission cable is longer still, having a length of 250 feet (e.g., a 250 foot, 50 ohm transmission cable between the pulsed power supply and the load). FIG. 6 shows the simulated load voltage, load current and source current waveforms with load arcing; load arcing begins at time 405 as shown on the trace shortly after the load sees the start of the 700 ns pulse. When the transmission cable is sufficiently long (e.g., the transmission cable has a length that is greater than half of the maximum pulse duration divided by the characteristic pulse speed on the cable), the source peak current is approximately the same as in the normal case, without arcing, shown in FIG. 3. In this example, the source peak current $I_{11}$ (FIG. 6, bottom) is about −322 A, while the load peak current $I_{load}$ (FIG. 6, middle) is about −610 A. Thus, the long transmission line can limit the load and source currents significantly during a load arcing condition. In this example, the longer the transmission line, the lower the arcing current. The ideal transmission line length would be such that the electromagnetic wave one-way propagation time is half of the pulse width. At this ideal transmission line length, when the electromagnetic wave comes back (e.g., is reflected) to pulsed power source, the switch in the source is opened already at normal working current level. In the simulations shown in FIGS. 3 to 6, the transmission cable has a characteristic pulse speed on the cable of approximately 1.5 ns/ft; thus for a 700 ns pulse a cable length of ½*700 ns/1.5 ns/ft gives a minimum cable length of about 233 ft. A long cable length also provides a distributed inductance that causes the leading edge of the reflected current to be "dispersed" and thereby slow the peak of the reflected current waveform. The effect on the pulse waveshape due to the distributed inductance is substantially less than would occur if discrete or "lumped element" inductors were used to achieve the same effect. Thus, the length does not overly distort the shape of the pulse applied to the load.

The use of a long cable to prevent damage due to arcing may therefore be superior to other methods of blocking the resulting arcing current and reflections, at least in part because of the minimization of pulse waveform distortion. Discrete circuit elements, such as discrete inductor components or "lumped element" inductors help to prevent large currents, but may result an unacceptable distortion of the applied pulses Thus, generically, the apparatuses described herein may generally include a nanosecond pulse delaying element that may delay the pulse from the pulse generator to the load by at least half the duration of the longest pulse width. The use of a long transmission line is a simple implementation of this idea; the long transmission line has the benefit of introducing very little distortion but serving to limit "disperse" the rising edge of the reflected current waveform and thereby mitigate arc damage at the pulse generator. Any other pulse delay circuitry capable of delaying the nanosecond pulse may be used, provided that it does not distort the nanosecond pulse (e.g., reduce the rise time significantly). In some variations the system may include pulse delay circuitry that delays the pulse by more than half the pulse duration of the applied nanosecond pulse and introduces a pre-distortion to the applied nanosecond pulse before entering the transmission cable, so that the pulse experienced by the load is approximately the intended shape and duration (e.g., having the rapid rise time), e.g., looking more "square". This pre-distortion may therefore account or correct for the distortion introduced by the delay circuitry. Pre-distortion may include shortening the pulse duration and/or sharpening the pulse. A pulse-shaping network or circuit may therefore be used either before, after, or both before and after the transmission line, but before the load.

The apparatuses and methods described herein may also or alternatively include impedance matching, e.g., between the transmission line and the electrodes. For example, the size of the electrodes may be configured to match the impedance for the load and the pulse delivery output with the transmission line. Alternatively or additionally, one or more discrete or distributed impedance elements may be included as part of the transmission line. Such distributed impedance elements may take the form of "stubs" that change the transmission line impedance in a distributed manner.

In any of the apparatuses and methods described herein, the length of the transmission cable may be less than a maximum length. In some variations the maximum length may be determined by the need to disperse the rising edge of the reflected current during an arc. For example, the length of the transmission cable may be less than 0.51 times the maximum pulse duration divided by the characteristic pulse speed on the cable. If the transmission cable is too long, the dispersion of the transmission line will attenuate peak pulse voltage and increase pulse rise time on the load. Thus, the length of transmission line may be between a minimum length appropriate to limit arcing current to the level that the pulsed power source can handle reliably, and a maximum length that prevents significant distortion of applied pulses.

The examples described above typically suggest an optimal minimum length for the transmission cable that is based on the maximum pulse duration to be applied by the system (and in some variations, to which the system may be limited), such as, e.g., 1000 ns. Typically, the proposed length is approximately half of the pulse duration of the maximum pulse duration multiplied by the characteristic pulse speed on the cable. At this length and greater, the current seen at the pulse generator due to load arcing will be completely blocked, as the pulse generator will have open switches, preventing any current from passing back to the pulse generator from the transmission cable. However, in some variations, a shorter length (e.g., 75% of this length, 80% of this length, 85% of this length, 90% of this length, 95% of this length), may be used instead, as the retrograde current transmitted back to the pulse generator may be attenuated or limited sufficiently (if not completely) by dispersion at these smaller lengths in order to prevent damage to the pulse generator. Thus, in some variations, the length of the cable may be F times the maximum pulse duration of the pulses to be applied by the apparatus divided by the characteristic pulse speed of the cable; where F is between 0.1 and 0.5 (e.g., 0.1, 0.25, 0.35, 0.375, 0.4, 0.425, 0.45, 0.475, etc.).

In general, for apparatuses that are limited to applying pulses less than 1000 ns, for example, between 100 ns and 1000 ns, and cables having a characteristic pulse propagation speeds of between 1.5 ns/ft and 1.2 ns/ft, the length of the transmission cable may be, e.g., between about 60 feet and 750 feet. For example, Table 1, below illustrates examples of minimum cable lengths for various combinations of maximum pulse durations and characteristic pulse speeds of cables.

TABLE 1

| maximum pulse duration | Cable length for various cable pulse velocities (ns/ft) | | | |
|---|---|---|---|---|
| (ns) | 1.5 ns/ft | 1.4 ns/ft | 1.3 ns/ft | 1.2 ns/ft |
| 100 | 33.3 ft | 35.7 ft | 38.5 ft | 41.7 ft |
| 150 | 50.0 ft | 53.6 ft | 57.7 ft | 62.5 ft |
| 200 | 66.7 ft | 71.4 ft | 76.9 ft | 83.3 ft |
| 250 | 83.3 ft | 89.3 ft | 96.2 ft | 104.2 ft |
| 300 | 100.0 ft | 107.1 ft | 115.4 ft | 125.0 ft |
| 350 | 116.7 ft | 125.0 ft | 134.6 ft | 145.8 ft |
| 400 | 133.3 ft | 142.9 ft | 153.8 ft | 166.7 ft |
| 450 | 150.0 ft | 160.7 ft | 173.1 ft | 187.5 ft |
| 500 | 166.7 ft | 178.6 ft | 192.3 ft | 208.3 ft |
| 550 | 183.3 ft | 196.4 ft | 211.5 ft | 229.2 ft |
| 600 | 200.0 ft | 214.3 ft | 230.8 ft | 250.0 ft |
| 650 | 216.7 ft | 232.1 ft | 250.0 ft | 270.8 ft |
| 700 | 233.3 ft | 250.0 ft | 269.2 ft | 291.7 ft |
| 750 | 250.0 ft | 267.9 ft | 288.5 ft | 312.5 ft |
| 800 | 266.7 ft | 285.7 ft | 307.7 ft | 333.3 ft |
| 850 | 283.3 ft | 303.6 ft | 326.9 ft | 354.2 ft |
| 900 | 300.0 ft | 321.4 ft | 346.2 ft | 375.0 ft |
| 950 | 316.7 ft | 339.3 ft | 365.4 ft | 395.8 ft |
| 1000 | 333.3 ft | 357.1 ft | 384.6 ft | 416.7 ft |

Table 1: examples of minimum transmission cable lengths for cables having different characteristic pulse speeds, using different maximum pulse durations.

As shown in Table 1, for systems in which the maximum pulse duration is approximately 1000 ns, the minimum transmission cable length, depending on the characteristic pulse speed of the cable, may be between about 333 ft and about 417 ft. If the maximum pulse duration is 100 ns, the cable length may be between about 33 ft and about 42 feet. Thus, for systems that are adjustable between 100 ns and 1000 ns, it may be best to choose a maximum cable length that is between these ranges, such as, e.g., between about 33 and about 420 ft (e.g., between about 45 and 420 feet, between about 75 and 450 feet, between about 100 and 450 feet, between about 200 and 450 feet, between about 300 and 450 feet, greater than 400 feet, greater than 415 feet, greater than 450 feet, etc.).

As mentioned above, any of the apparatuses and methods described herein may be used for electroporation of biological material in a container (e.g., in a cuvette). Electroporation is a cell-membrane modification technique where a moderate voltage, typically less than 1000 V is applied to a small chamber, or cuvette, holding a suspension of cells in solution. The solution is often designed to present an environment around the cells that mimics the natural environment of the cell, such as physiological fluids when the cells are taken from human or animal tissue. The chamber, or cuvette, is typically small and has an electrical pulse impedance of ~15Ω. Typically, the cuvette electroporation pulse duration may be several microseconds to several milliseconds and, at these pulse durations, the voltages are usually in the 100 V range, with a resulting current of ~100/15=6.7 A.

However, when nsPEF pulses, which are in the nanosecond range, are used for cuvette cell suspensions, the voltage used can be many kV, such as 5 kV to 8 kV. Additionally, pulses in the nanosecond range must have a good impedance-match of the cable that transmits the pulses to the cuvette impedance. As cables with characteristic impedances of 15Ω may be difficult to fabricate and obtain commercially, a method of ensuring that the load at the end of the cable is approximately the same as the cable impedance may be beneficial. If the pulse transmission cable is not matched to the load (which includes the cuvette with cell suspension), then the pulse may be distorted and may not achieve the desired effect on the cell suspension.

In addition, delivery of pulses in the kV range (e.g., >1-2 kV) may risk arcing at the cuvette. For instance, if the cell suspension contains some contamination, the nsPEF pulse may cause an arc within the cell suspension that can result in currents of >1 kA which can damage the pulse generator as it is actively generating a pulse.

The apparatuses described herein may provide a distributed circuit that enables multi-kilovolt nanosecond pulses to be delivered to a cuvette and uses commercially available high-voltage coaxial cable to transmit the nsPEF pulses (such as Teledyne Reynolds 167-2669 or 178-8793, which are 31Ω characteristic impedance and 20 kV rated). The apparatuses and methods described herein may also ensure an impedance match between the load (the cuvette fixture containing the cuvette) and the high-voltage cable, and may prevent damage to the pulse generator using arcing at the cuvette or cuvette fixture.

The apparatuses and methods described herein may also provide high-accuracy measurement of the voltage and current at the load (e.g., at the cuvette or handpiece), ensuring that the therapeutic voltage and current at the cuvette cell suspension conforms to the intended pulse parameters.

As mentioned above, in many high-voltage/high-power pulse generator designs the high-voltage is rapidly switched from an energy storage circuit into a pulse generation path. A typical high-voltage/high-power pulse generator example is the Marx generator, which is a designed to charge high-voltage capacitors in parallel and then rapidly switch these charged capacitors to a series circuit that discharges through a different circuit than the charging circuit. Arc damage to a pulse generator such as this may occur when the arc causes a current much higher than the pulse current rating of the switching elements.

The apparatuses and methods described herein may help ensure that, if an arc occurs at the cuvette or cuvette fixture, the pulse generator is not in the connected mode, actively outputting a pulse. As described above, this may be accomplished by using a long cable between the pulse generator output and the cuvette fixture. The cable length provides a time delay and a distributed inductance from the end of the pulse delivery output (when the pulse generator is not actively outputting the high-voltage pulse) to the pulse delivery output (e.g., the cuvette fixture).

The speed of the pulse on a cable is v (in feet/second) $=1/\sqrt{LC}$, where L is the cable inductance per foot and C is the cable capacitance per foot. For a typical 31Ω coaxial cable (such as Teledyne Reynolds model 178-8783 20 kV 31Ω coaxial cable), this pulse speed is 67% of the speed of light, or 1.5 ns/ft of cable. Additionally, the cable inductance prevents the current from rising too quickly, as a rapid change in current results in a voltage to oppose the change in current. This is shown in the classic inductor equation $V_{inductor}=L*di/dt$, meaning if the current through an inductor changes rapidly (di/dt, the change in current with time) then the inductor will generate a voltage that opposes the change in current. This inductance will be distributed, as will occur with a long cable, as can provide a high inductance with minimal distortion of the pulse waveform. A "lumped" inductance, such as would be provided by one or more inductor components, would cause severe pulse distortion, usually through large overshoot and undershoot at the rising or falling edges of the pulse waveform.

The transmission cable from the pulse generator to the cuvette fixture may be selected to be long enough so that the combined time delay and cable distributed inductance causes the current to rise more slowly during an arc and delays the high-current return pulse so that the pulse-creating switches inside the pulse generator are in the safe position by the time the high-current pulse propagates from the load (e.g., the cuvette fixture) to the pulse generator.

Figure 7:
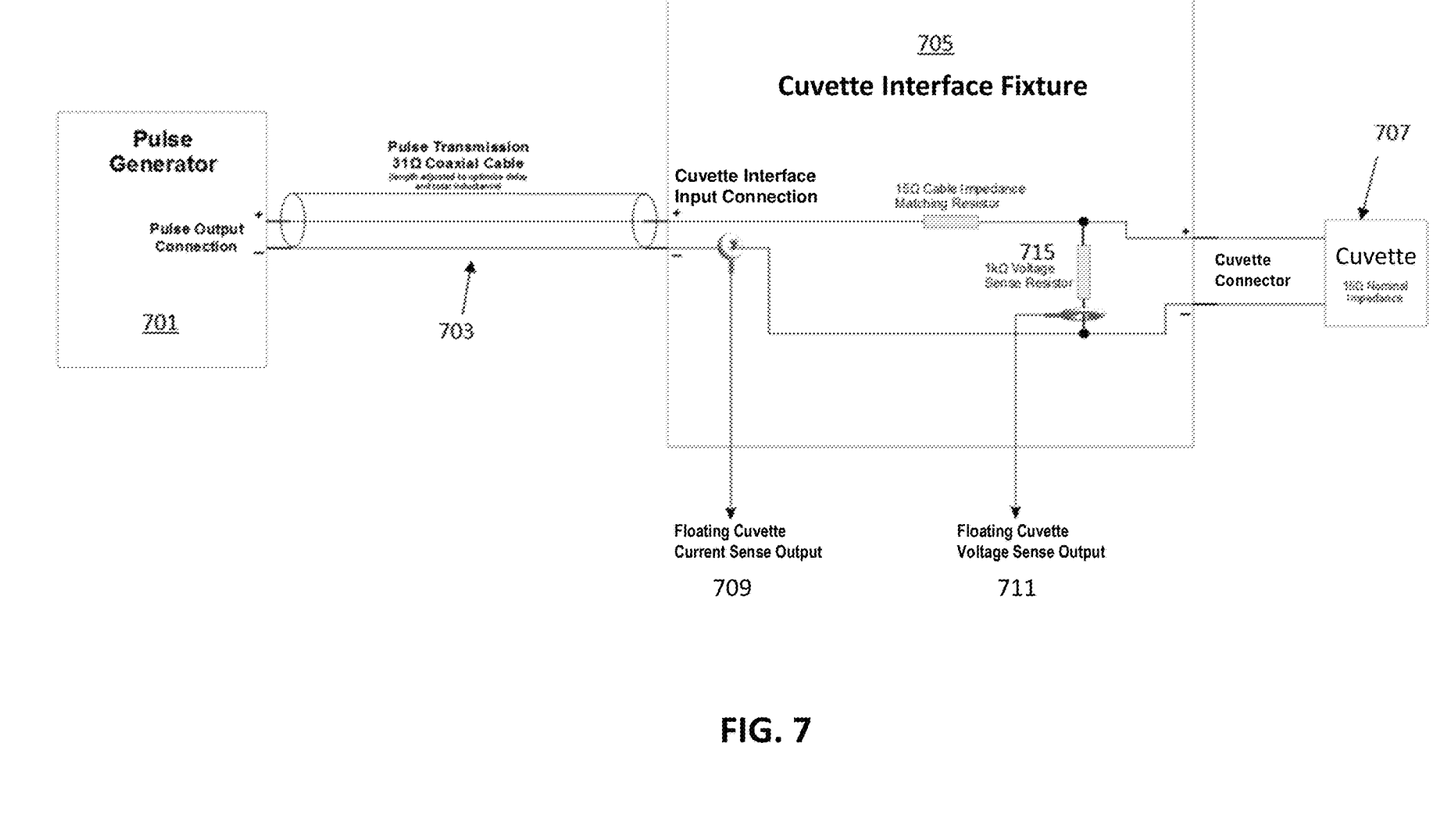
FIG. 7 schematically illustrates another example of an apparatus for delivering nanosecond pulsed electrical energy including a nanosecond pulse generator ("pulse generator") configured to provide a high voltage, high current pulsed output, a transmission cable, and a pulse delivery output connected to the pulse generator through the transmission cable. In this example the pulse delivery output is configured as a chamber (e.g., a cuvette chamber).

FIG. 7 illustrates an example of a schematic diagram of an apparatus including a long cable to prevent pulse generator damage due to arcing at the load. In FIG. 7, the apparatus includes a nanosecond pulse generator 701, that is connected to a transmission cable 703, which is in turn connected (or connectable) to a cuvette 707; in FIG. 7 the connection is first made through an interface fixture 705 to the cuvette 707.

The characteristic impedance of a cable is the ratio of voltage to current for a high-frequency AC (or RF) waveform present in the conductors of the cable. For a long cable carrying high-voltage and/or high-current nanosecond pulses, the load impedance, in this case the cuvette and cuvette interface fixture, should optimally have an impedance that is very close (e.g., within 10%) of the cable characteristic impedance. A "well-matched" load impedance may prevent pulse reflections on the cable that distorts the delivered pulse and can cause overvoltage at the load, which can lead to an arc at the cuvette. Thus, in the example shown in FIG. 7, a 15Ω resistor is added in series with the nominal 15Ω cuvette impedance, so that the series impedance is close to the 31Ω cable impedance. This impedance is shown in series with the cuvette load in FIG. 7. Although this may reduce the voltage to the cuvette by 50%, a cuvette typically cannot be used with voltages>6 kV, so that a pulse generator capable of 2x this voltage is adequate to drive the cuvette to its voltage limits.

Any of the apparatuses and methods described herein may use a floating voltage 711 and/or floating current 709 sensor, as illustrated schematically in FIG. 7. It is typical to measure current into a load with a current sensor coil measuring the current in a wire or shunt passing through the coil. High-voltage is frequently measured by using a voltage divider with a high divider ratio, for instance measuring a 15 kV voltage, a typical design may use a 150 MΩ resistor in series with a 15 kΩ resistor to create a 10,000:1 divider. Disadvantageously, this may result in coupling of the high-voltage to the measurement equipment. Instead, as described herein, the voltage across the cuvette may be measured by using a parallel 1 kΩ pulse-rated, low-inductance, resistor 715 (voltage sense resistor), and the current through it may be measured using a high-bandwidth current sensor coil. Any pulse-rated low-inductance resistor can be used, provided the current through it is considered when interpreting the measured current into the pulse delivery output (e.g., cuvette fixture). The capacitive coupling from the coil to the current shunt can be as low as 0.5 pF, so that even nanosecond high-voltage pulses have very little coupling to the measurement instruments (typically an oscilloscope or high-speed pulse waveform recording device).

Figure 8:
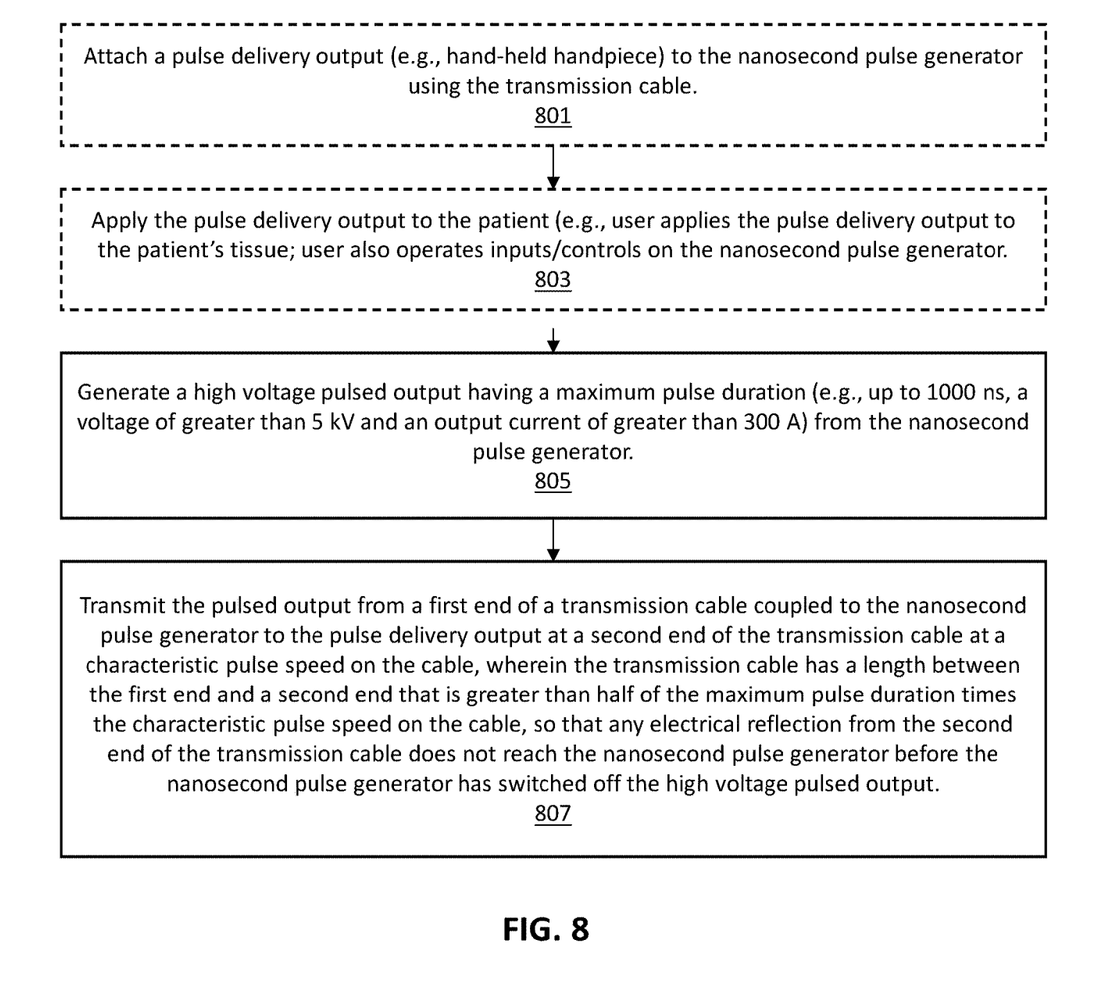
FIG. 8 illustrates an example of the steps of one method of delivering nanosecond pulsed electrical energy to a biological material (e.g., tissue) as described herein.

As described above, the apparatuses described herein may be used to transmit signals from a nanosecond pulse generator to an output, such as an electrical output, that is coupled via a cable adapted to prevent electrical reflections. For example, FIG. 8 illustrates one example of a method of delivering nanosecond pulsed electrical energy to a biological material (e.g., tissue). Optionally, an output ("pulse delivery output" such as a handpiece) may be attached to a nanosecond pulse generator through a transmission cable 801. In some variations the transmission cable and/or handpiece may already be attached. A pulse delivery output may then be applied to the a patient 803. For example, the user may apply the pulse delivery output to the patient's tissue. The user may also operate inputs/controls on to the nanosecond pulse generator.

The nanosecond pulse generator may provide a high voltage (in some variations, high current) output having a maximum pulse duration of less than about 1000 ns (e.g., between 100 ns and 1000 ns) 805. The output may have a voltage of greater than, e.g., 5 kV, 10 kV or 15 kV and an output current of greater than about 300 A from the nanosecond pulse generator.

In any of these methods, the pulsed output may be transmitted from a first end of a transmission cable coupled to the nanosecond pulse generator to the pulse delivery output at a second end of the transmission cable at a characteristic pulse speed on the cable, wherein the transmission cable has a length between the first end and a second end that is greater than half of the maximum pulse duration times the characteristic pulse speed on the cable 807. For example, the cable portion inside the housing may have a length of between 5 and 450 feet so that any electrical reflection from the second end of the transmission cable does not reach the nanosecond pulse generator before the nanosecond pulse generator has switched off the high voltage pulsed output.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An apparatus for delivering nanosecond pulsed electrical energy comprising:
    a nanosecond pulse generator configured to provide at least a high voltage pulsed output having a maximum pulse duration of up to 1000 ns;
    a transmission cable coupled to the nanosecond pulse generator at a first end, the transmission cable having a characteristic impedance ($Z_0$) and a characteristic pulse speed (v), wherein the transmission cable has a length between the first end and a second end that is greater than or equal to F times of the maximum pulse duration (in ns) divided by the characteristic pulse speed on the transmission cable (in ns/ft), wherein F is between 0.1 and 0.5; and
    a pulse delivery output, wherein the pulse delivery output couples to the second end of the transmission cable.

2. The apparatus of claim 1, wherein the nanosecond pulse generator is configured to provide at least a 200 kV/µs high voltage, high-current pulsed output.

3. The apparatus of claim 1, further comprising a housing enclosing at least a portion of the nanosecond pulse generator, further wherein at least a majority of the transmission cable is stored within the housing.

4. The apparatus of claim 3, wherein an internal cable length that is housed within the housing is 10 feet or longer.

5. The apparatus of claim 1, wherein between 5 and 420 feet of the length of the transmission cable is within a housing that encloses at least a portion of the nanosecond pulse generator.

6. The apparatus of claim 1, wherein the length of the transmission cable is configured to have a distributed inductance that decreases currents of 1 kA or greater that are reflected back to the nanosecond pulse generator.

7. The apparatus of claim 1, wherein the characteristic impedance of the transmission cable is between 30 ohms and 175 ohms.

8. The apparatus of claim 1, wherein the characteristic pulse speed on the transmission cable is between 1.2 ns/ft and 1.6 ns/ft.

9. The apparatus of claim 1, wherein the pulse delivery output comprises a handpiece configured to deliver the high voltage pulsed output.

10. The apparatus of claim 9, wherein the handpiece comprises a removable tip having a plurality of tissue-penetrating electrodes.

11. The apparatus of claim 1, wherein the pulse delivery output comprises a cuvette fixture.

12. The apparatus of claim 1, wherein the high voltage pulsed output generated by the nanosecond pulse generator is configured to have a voltage of greater than 5 kV and an output current of greater than 300A.

13. The apparatus of claim 1, further comprising a current sensor at or near the second end of the transmission cable, wherein the current sensor comprises a pulse-rated, low-inductance resistor connected in parallel with the transmission cable and a high-bandwidth current sensor coil configured to measure current through the pulse-rated, low-inductance resistor.

14. A method of delivering nanosecond pulsed electrical energy to a biological material, the method comprising:
   generating a high voltage pulsed output having a maximum pulse duration of up to 1000 ns; and
   transmitting the pulsed output from a first end of a transmission cable coupled to a nanosecond pulse generator to a pulse delivery output at a second end of the transmission cable at a characteristic pulse speed on the transmission cable;
   wherein the transmission cable has a length between the first end and the second end that is greater than or equal to F times of the maximum pulse duration divided by the characteristic pulse speed on the transmission cable wherein F is between 0.1 and 0.5, so that any electrical reflection from the second end of the transmission cable do not reach the nanosecond pulse generator before the nanosecond pulse generator has switched off the high voltage pulsed output.

15. The method of claim 14, wherein generating the high voltage pulsed output comprises generating a high voltage pulsed output having a maximum pulse duration of between 50 ns and 1000 ns, a voltage of greater than 5 kV and an output current of greater than 300 A, from the nanosecond pulse generator.

16. The method of claim 14, further comprising delivering the pulsed output into a tissue from a pulse delivery output coupled to the second end of the transmission cable.

17. The method of claim 16, wherein delivering the pulsed output comprises delivering the pulsed output from a cuvette feature.

18. The method of claim 14, further comprising decreasing currents of 1 kA or more that are reflected back to the nanosecond pulse generator based on a distributed inductance of the length of the transmission cable to prevent damage to the nanosecond pulse generator.

19. The method of claim 14, wherein the high voltage pulsed output has a voltage of at least 200 kV/µs.

20. The method of claim 14, wherein the transmission cable comprises an internal cable length that is housed within a housing enclosing the nanosecond pulse generator and an external cable length that is extended or extendable from the housing, and wherein the internal cable length is longer than the external cable length.

21. The method of claim 14, wherein transmitting the pulsed output from the first end of the transmission cable to the second end of the transmission cable comprises transmitting the pulsed output through between 35 and 450 feet of the length of the transmission cable.

22. The method of claim 14, wherein the characteristic pulse speed on the transmission cable is between 1.2 ns/ft and 1.6 ns/ft.

23. An apparatus for delivering nanosecond pulsed electrical energy comprising:
   a nanosecond pulse generator configured to provide at least a high voltage pulsed output having a maximum pulse duration of up to 1000 ns;
   a housing at least partially enclosing the nanosecond pulse generator;
   a transmission cable coupled to the nanosecond pulse generator at a first end, the transmission cable having a characteristic impedance ($Z_0$) and a characteristic pulse speed (v), wherein the transmission cable has a transmission cable length comprising an internal cable length that is housed within the housing and an external cable length that is extended or extendable from the housing, wherein a majority of the transmission cable length is the internal cable length, such that a distributed inductance of the transmission cable decreases currents of 300 A or more that are reflected back to the pulse generator to prevent damage to the nanosecond pulse generator; and
   a pulse delivery output, wherein the pulse delivery output couples to the external cable length of the transmission cable.

24. The apparatus of claim 23, wherein the internal cable length is 10 feet or longer.

25. The apparatus of claim 23, wherein the internal cable length is fixed.

* * * * *